US005831547A

United States Patent [19]

[11] Patent Number: 5,831,547

[45] Date of Patent: Nov. 3, 1998

Ohtsuki et al.

[54] WIRELESS CARD SYSTEM

[75] Inventors: Michihito Ohtsuki; Shinichiro Iwata, both of Tokyo, Japan

[73] Assignee: NEC Corporation, Tokyo, Japan

[21] Appl. No.: 711,443

[22] Filed: Sep. 6, 1996

[30] Foreign Application Priority Data

| | | | |
|---|---|---|---|
| Sep. 6, 1995 | [JP] | Japan | 7-228452 |
| Sep. 14, 1995 | [JP] | Japan | 7-262430 |

[51] Int. Cl.[6] ..... G06F 15/00

[52] U.S. Cl. ..... 340/825.54; 235/384

[58] Field of Search ..... 235/384, 380, 235/382, 381, 379, 377, 492, 493; 340/825.54, 825.31, 825.34; 246/182 C; 369/54; 380/4

[56] References Cited

U.S. PATENT DOCUMENTS

| | | | |
|---|---|---|---|
| 5,382,778 | 1/1995 | Takahira et al. | 235/380 |
| 5,414,249 | 5/1995 | Matsumoto | 235/384 |
| 5,487,516 | 1/1996 | Murata et al. | 246/182 C |

FOREIGN PATENT DOCUMENTS

| | | |
|---|---|---|
| 57207285 | 12/1982 | Japan . |
| 63175985 | 7/1988 | Japan . |
| 1320570 | 12/1989 | Japan . |
| 4356855 | 12/1992 | Japan . |

*Primary Examiner*—Michael Horabik
*Assistant Examiner*—Jean B. Jeanglaude
*Attorney, Agent, or Firm*—Whitham, Curtis & Whitham

[57] ABSTRACT

A wireless card, in response to a synchronization signal received from a gate machine, transmits a user information to the gate machine. The gate machine examines whether the wireless card is available using the user information. Necessary information obtained based on the user information is retained in the wireless card when it passes through the gate. A user can be informed of the necessary information at any desired time after passing through the gate. The necessary information is generated in the wireless card and/or in the gate machine. The necessary information obtained in the gate machine is transmitted from the gate machine to the wireless card.

31 Claims, 14 Drawing Sheets

| |
|---|
| ID NUMBER<br>SEX CODE<br>AGE<br>START DATE<br>END DATE |
| START STA. CODE<br>LINE CODE L1<br>BRANCH STA. CODE<br>LINE CODE L2<br>END STA. CODE |
| EOF CODE |

F I G. 1 0 B

| |
|---|
| VALID FLAG |
| BOARDING STA. CODE |
| DIRECTION D1 CODE<br>DEPARTURE TIME AT BOARDING STA.<br>START STA. CODE<br>ARRIVAL TIME AT START STA.<br>DELAY CAUSE CODE<br>DELAY TIME |
| DIRECTION D2 CODE<br>DEPARTURE TIME AT BOARDING STA.<br>ARRIVAL TIME AT TRANSFER STA.<br>TRANSFER STA. CODE<br>DEPARTURE TIME AT TRANSFER STA.<br>END STA. CODE<br>ARRIVAL TIME AT END STA.<br>DELAY CAUSE CODE<br>DELAY TIME |
| EOF CODE |

F I G. 1 1

| |
|---|
| INVALID FLAG |
| ERROR CODE |
| EOF CODE |

WIRELESS CARD SYSTEM

BACKGROUND OF THE INVENTION

1. Field of the Invention

The present invention generally relates to a wireless card system, and in particular to a wireless card and a gate system which enables communicating with the wireless card passing through a predetermined area.

2. Description of the Related Art

There have been proposed a variety of automatic ticket gate systems using a ticket card such as a commuter ticket or a coupon ticket. In Japanese Patent Unexamined Publication No. 1-320570, an ID card system has been disclosed where a card reader system is provided with an information processing function of determining whether the user carrying an ID (identification) card is admitted into the building. In Japanese Patent Unexamined Publication No. 4-356855, a system for collecting fares has been disclosed where the examination of a commuter ticket is performed by a card reader system.

A wireless card system has been disclosed in Japanese Patent Unexamined Publication No. 63-175985. In this system, an IC (integrated circuit) card is connected to a central processing computer through a wireless communication means by which data is read from and written to the IC card. However, there is no description on the automatic ticket gate system but a general description on the IC card system.

As another kind of automatic ticket gate system, a display system for displaying transportation guide information has been disclosed in Japanese Patent Unexamined Publication No. 57-207285. According to this system, a magnetic ticket such as a commuter ticket causes the automatic ticket gate system to display the transportation guide information. More specifically, when a passenger inserts the magnetic ticket into the slot of an automatic ticket gate machine, the system examines the magnetic ticket and, at the same tine, reads the destination of the passenger from the magnetic ticket. Based on the destination and the current time, the system searches a time table memory for related information including the departure time of available transportation and displays it on the display panel located near the automatic ticket gate machine for a predetermined time period. Therefore, the passenger can know the necessary information about available transportation when passing through the gate.

In the ticket gate systems mentioned above, however, the passenger tends to forget to see, for instance, the expiration data of the commuter ticket or the necessary information regarding available transportation. In the case where the passenger forgot to see the expiration data of the commuter ticket, the passenger may be made aware of the expiration by an audible alert or the ticket gate being suddenly closed when passing.

In the case where the passenger forgot to see the necessary information regarding available transportation, it is almost impossible to display the same information for the passenger because, in many cases, other passengers are successively passing through that gate. Further, it is very difficult to display enough information on the display panel because there may be little time for each passenger to read it at the gate.

SUMMARY OF THE INVENTION

An object of the present invention is to provide a wireless card system which enables informing a user of necessary information with reliability.

Another object of the present invention is to provide a wireless card system which enables informing a user of the necessary information regarding available transportation with reliability.

Still another object of the present invention is to provide a wireless card which enables informing a user of the expiration of the available period approaching with reliability.

According to the present invention, a wireless card storing user information is started up by a gate machine and holds necessary information obtained based on the user information when passing through the gate. A user can be informed of the necessary information at any desired time after passing through the gate. The necessary information is generated in the wireless card and/or in the gate machine. The necessary information obtained in the gate machine is transmitted from the gate machine to the wireless card.

According to a first aspect of the present invention, in a system comprising an examining machine and a wireless card carried by a user, the examining machine is provided with a first wireless communication means which communicates with the wireless card passing through a predetermined area in which a startup signal or a synchronization signal is transmitted periodically. The examining machine is further comprised of an examining means which examines whether the wireless card is available based on user information received from the wireless card.

The wireless card is also provided with a second wireless communication means for communicating with the examining machine. The wireless card is comprised of a memory which has stored the user information including an expiration time and an available transportation section. The user information is transmitted to the examining machine in response to the startup signal received from the examining machine. The information is generated in the wireless card based on a time remaining until the expiration time, and is provided to a user by an informer. More specifically, it is determined whether the time remaining until the expiration time is smaller than a predetermined time period when the startup signal has been received from the examining machine. When it is determined that the time remaining until the expiration time is smaller than the predetermined time period, the informer informs the user by sound, light, or vibration of the expiration time approaching. Preferably, the informer informs the user a predetermined time interval after it is determined that the time remaining until the expiration time is smaller than the predetermined time period.

According to a second aspect of the present invention, in a system for providing transportation guide information to a user, the gate machine is further comprised of a retrieving means for retrieving the transportation guide information from a transportation information database based on an available transportation section included in the user information. The transportation guide information is transmitted to the wireless card.

The wireless card is further comprised a memory which stores the transportation guide information received from the gate machine. The transportation guide information stored in the memory is indicated, for instance, on a display according to a user's instruction. In addition, when it is determined that the time remaining until the expiration time is smaller than the predetermined time period, the informer preferably informs the user by sound, light, or vibration of the expiration time approaching. Further preferably, the informer informs the user a predetermined time interval after it is determined that the time remaining until the expiration time is smaller than the predetermined time period.

As described above, since the information related to the user information is indicated in the wireless card, the user can be informed of the information at any desired time according to the user's instruction. Further, since the information indicative of the expiration time approaching is generated in the wireless card, the user is informed of the availability of the wireless card with reliability. Furthermore, since the information indicative of transportation guide information related to the user information is generated in the gate machine and then is transferred to the wireless card, the user can be informed of the transportation guide information at any desired time by the user's instruction.

BRIEF DESCRIPTION OF THE DRAWINGS

FIG. 10B is a schematic diagram showing the available transportation information of FIG. 10A;

FIG. 11 is a schematic diagram showing invalid information transmitted from the automatic ticket gate machine to the wireless card according to the second embodiment of FIG. 7;

DETAILED DESCRIPTION OF THE PREFERRED EMBODIMENTS

WIRELESS CARD SYSTEM

Figure 1A:
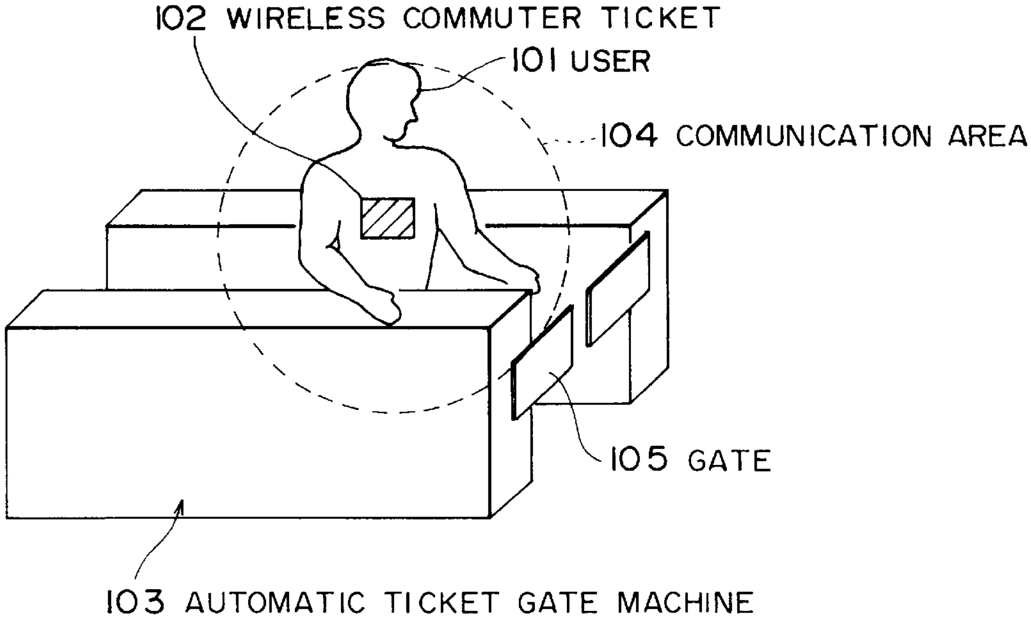
FIG. 1A is a schematic diagram showing an automatic ticket gate system according to an embodiment of the present invention.

Referring to FIG. 1A, a user or passenger 101 is carrying a wireless card 102 (here a commuter ticket) and is about to pass through an automatic ticket gate machine 103. A wireless card system according to the present invention is comprised of the wireless card 102 and the automatic ticket gate machine 103 which enable communicating with each other when the wireless card 102 is passing through a predetermined communication area 104 which is formed in a passage by the automatic ticket gate machine 103. Each of the wireless card 102 and the automatic ticket gate machine 103 is comprised of a wireless communication means such as a radio transmitter-receiver, an optical transmitter-receiver, or another non-contact communication means. The automatic ticket gate machine 103 has a gate 105 at one end of the passage, which is opened or closed depending on the validity of the wireless commuter ticket 102.

Figure 1B:
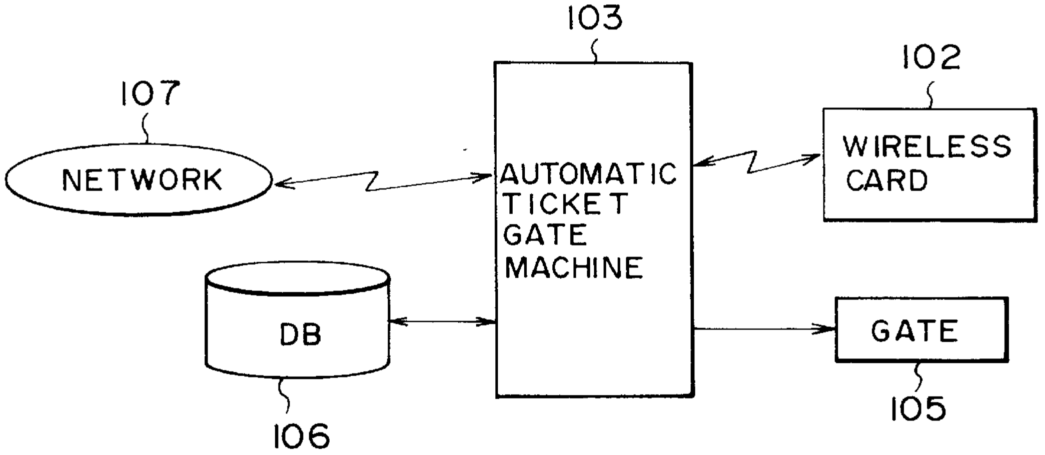
FIG. 1B is a schematic block diagram showing the automatic ticket gate system of FIG. 1A.

Referring to FIG. 1B, the automatic ticket gate machine 103 may be connected to a database 106 and an external network 107 as described later. The database 106 contains a time table and other transportation information. Hereinafter, system configurations and operations will be described in detail.

WIRELESS CARD

Figure 2:
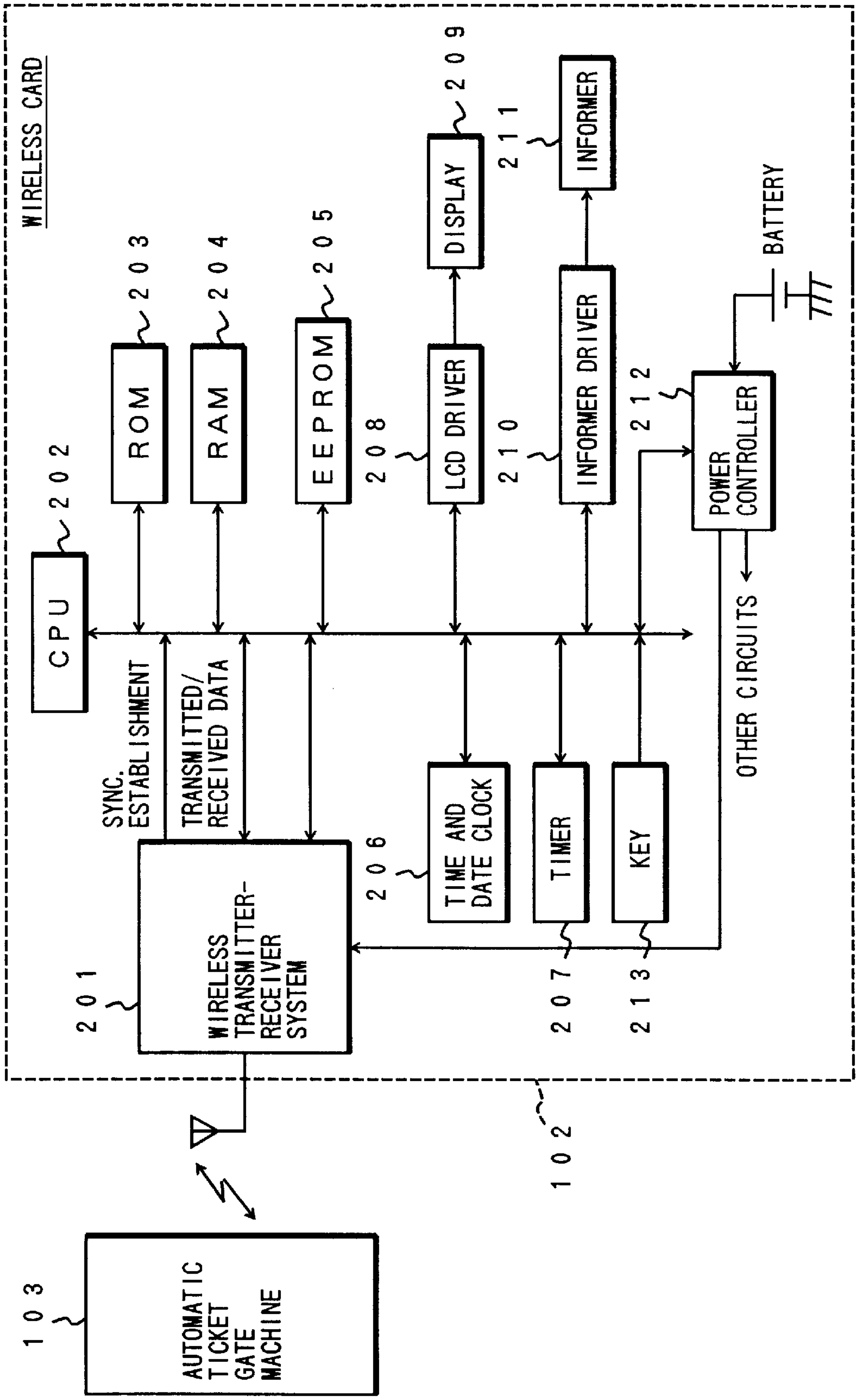
FIG. 2 is a block diagram showing a first embodiment of a wireless card according to the present invention.

Referring to FIG. 2, the wireless card 102 is provided with a wireless transmitter-receiver system 201 which enables communicating with the automatic ticket gate machine 103 when the user 101 carrying the wireless card 102 enters the communication area 104 of the automatic ticket gate machine 103. The wireless transmitter-receiver system 201 has a radio transceiver and a modulator-demodulator (not shown) therein in this embodiment.

A processor (CPU) 202 controls the whole operation of the wireless card 102 according to a program stored in a read-only memory (ROM) 203 with using a random access memory (RAM) 204 as a work area. The RAM 204 may be also used to store necessary information, for instance, transportation information received from the automatic ticket gate machine 103 as described later. An EEPROM (electrically erasable programmable ROM) 205 previously stores user information as preset data. In the case of a commuter ticket, for example, the user information includes a user ID number, the expiration date, and an available section between two stations. A time and date clock 206 is used to check whether a predetermined date previous to the expiration date is reached.

The processor 202 is also connected to a timer 207, an LCD driver 208, an informer driver 210. A display device 209 such as a liquid-crystal display (LCD) is connected to the LCD driver 208 and an informer 211 such as a speaker, a light-emitting diode, or a vibrator is connected to the informer driver 210. A power controller 212 receives power from a battery and supplies it to the wireless transmitter-receiver system 201 and other circuits. A key 213 is used to turn the power on or off and to read the transportation information from the RAM 204 and display it on screen.

AUTOMATIC TICKET GATE MACHINE

Figure 3:
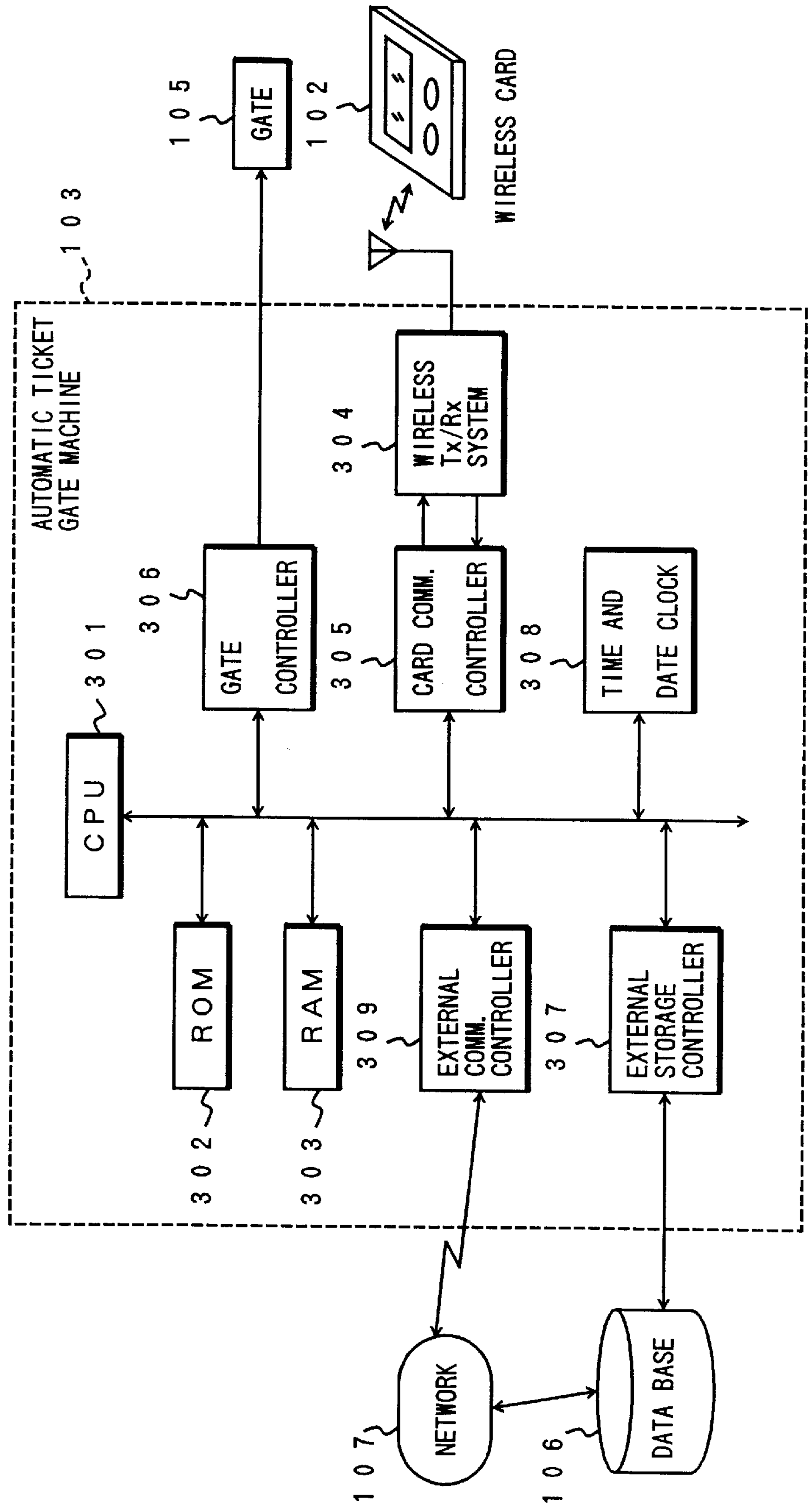
FIG. 3 is a block diagram showing an embodiment of an automatic ticket gate machine according to the present invention.

Referring to FIG. 3, the automatic ticket gate machine 103 is provided with a processor (CPU) 301 which controls the whole operation of the automatic ticket gate machine 103 according to procedures of a program stored in a ROM 302 using a RAM 303 as a work area.

A wireless transmitter-receiver system 304 has a radio transceiver and a modulator-demodulator (not shown) therein in this embodiment, enabling communication with the wireless card 102 when the user 101 carrying the wireless card 102 enters the communication area 104 of the automatic ticket gate machine 103. The wireless transmitter-receiver system 304 is controlled by a card communication controller 305 under the control of the processor 301. In this embodiment, the wireless transmitter-receiver system 304 transmits a synchronization signal as a startup signal over the communication area 104 so that a wireless card starts up a predetermined procedure when passing through the communication area 104, and then receives the user information from the wireless card 102 to store it onto the RAM 303.

A gate controller 306 controls the open/close operation of the gate 105 depending on whether the wireless card 102 is available. An external storage controller 307 controls the database 106 storing transportation data including time tables containing station names, departure time, arrival time, and other information regarding the whole service area transportation.

A time and date clock 308 is used to check whether the wireless card 102 is available by referring to the expiration date and the available section included in the user information stored in the RAM 303. A time and date clock 308 is also used to search the database 106 for necessary transportation information by using the user information stored in the RAM 303. The necessary transportation information includes, for example, the departure time of the best train bound for the destination designated in the user information as of this point in time.

The automatic ticket gate machine 103 is further provided with an external communication controller 309 which is connected to the network 107 to communicate with another station and another transportation company. In cases where the timetable of a transportation company is revised or the timetable is temporarily changed due to an accident, the revised transportation data is received and then stored onto the database 106 through the network 107.

FIRST EMBODIMENT

Figure 4:
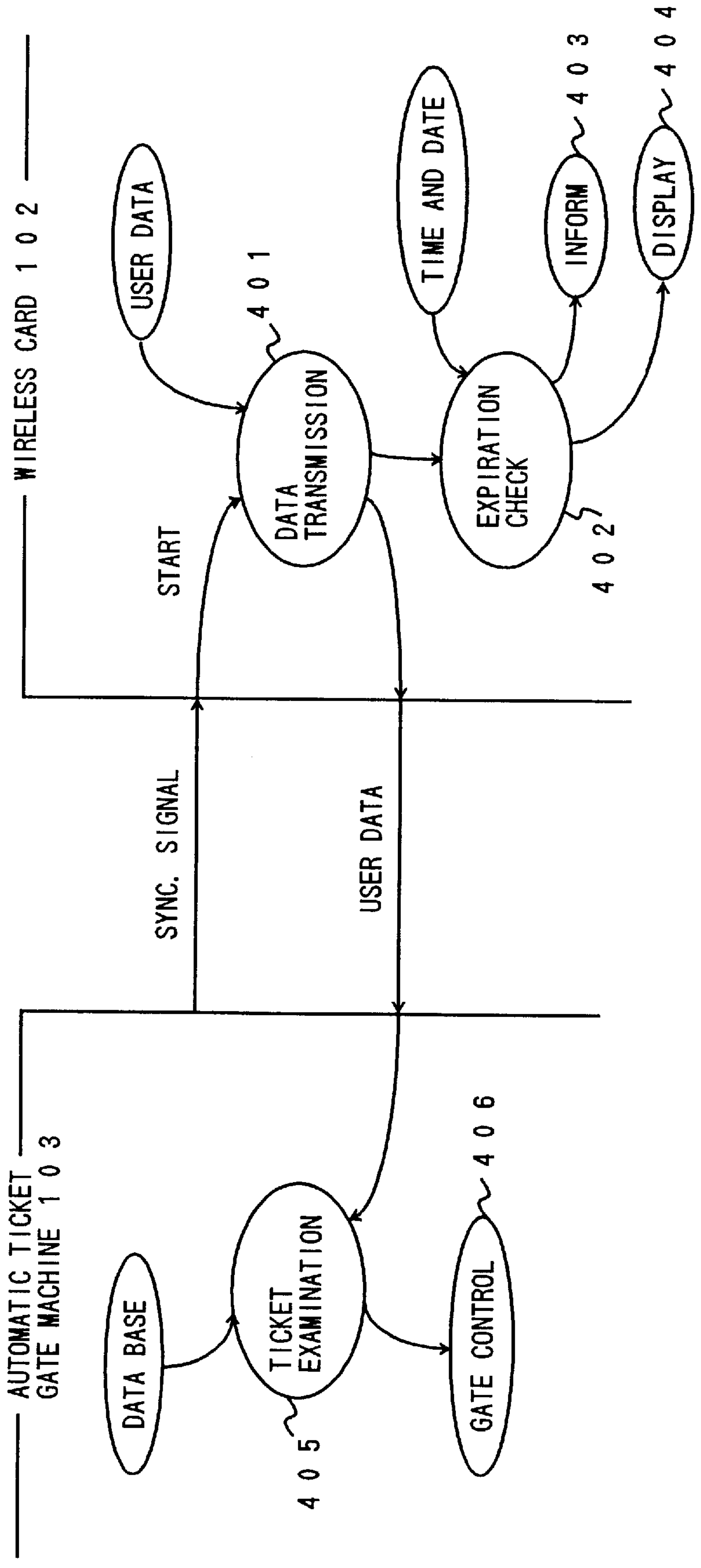
FIG. 4 is a schematic diagram showing a first embodiment of a wireless communication method according to the present invention.

As illustrated in FIG. 4, when the wireless transmitter-receiver system 201 receives the synchronization (sync) signal from the automatic ticket gate machine 103 and detects the synchronization establishment, the processor 202 starts up a data transmission procedure 401 and an expiration check procedure 402. More specifically, the user information including the user ID number, the expiration date, and an available section is transferred from the EEPROM 205 to the RAM 204. The user information is then transferred to the wireless transmitter-receiver system 201 which transmits them to the automatic ticket gate machine 103. Further, the processor 202 checks whether the expiration date approaches by comparing the expiration date to the present date obtained by the time and date clock 206. When the time remaining until the expiration date is smaller than a predetermined number of days, for example, three days, the processor 202 activates the informing procedure 403 and, as necessary, the displaying procedure 404. By the informer beeping, vibrating, or blinking, the user 101 is informed of the expiration date, approaching. The expiration date may be displayed on the LCD 209.

On the other hand, the automatic ticket gate machine 103, receiving the user information from the wireless card 102, performs the ticket examination 405 and the gate control 406. More specifically, the processor 301 compares the expiration date and the available section of the user information to the present date obtained by the time and date clock 308 and the route data obtained from the database 106, respectively. When the wireless card 102 is available, the processor 301 performs the gate control 406 such that the gate 105 is opened and, when not available, the gate 105 is closed with the audible alert.

Further, when the wireless card 102 is available, the processor 301 registers the user ID number as examined onto the database 106.

FIRST INFORMING METHOD

Figure 5:
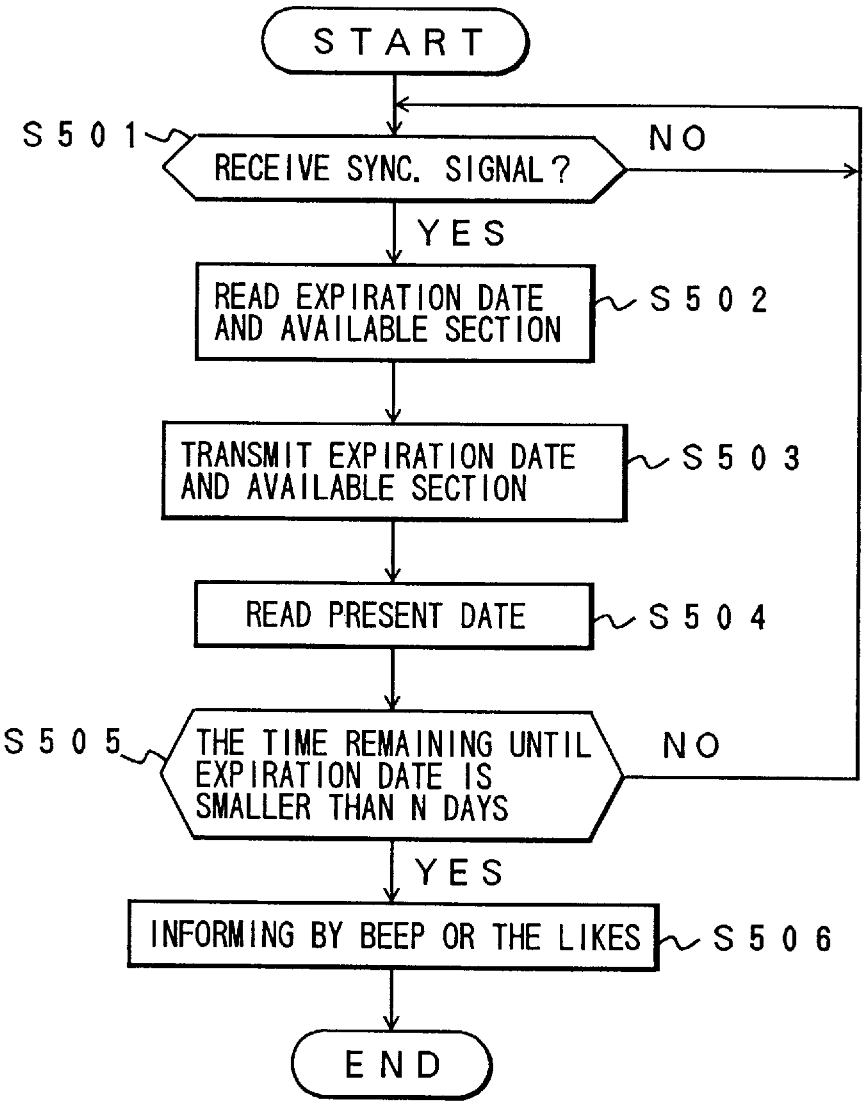
FIG. 5 is a flowchart showing a first operation of the wireless card according to the first embodiment of FIG. 4.

Referring to FIG. 5, when the wireless transmitter-receiver system 201 receives the sync signal from the automatic ticket gate machine 103 and detects the sync establishment (S501), the processor 202 reads the expiration date and the available section from the EEPROM 205 (S502), and they are transmitted to the automatic ticket gate machine 103 (S503). Further, the processor reads the present date from the time and date clock 206 (S504), and then compares the expiration date to the present date (S505). When the time remaining until the expiration date is smaller than N (N is a predetermined integer), the processor 202 starts the informer 211 beeping, vibrating, or blinking, so that the user 101 is made aware of the expiration date approaching (S506).

The number N is arbitrary determined. As a matter of practicality, the number N will be determined to be one of 1, 2, and 3. Assuming the number N is set to 3, when four or more days remain until the expiration date, the wireless card 102 is silent, however when three or less days remain until the expiration date, the wireless card 102 informs the user of the expiration date of the commuter ticket each time the user passes through the automatic ticket gate machine 103.

SECOND INFORMING METHOD

Figure 6:
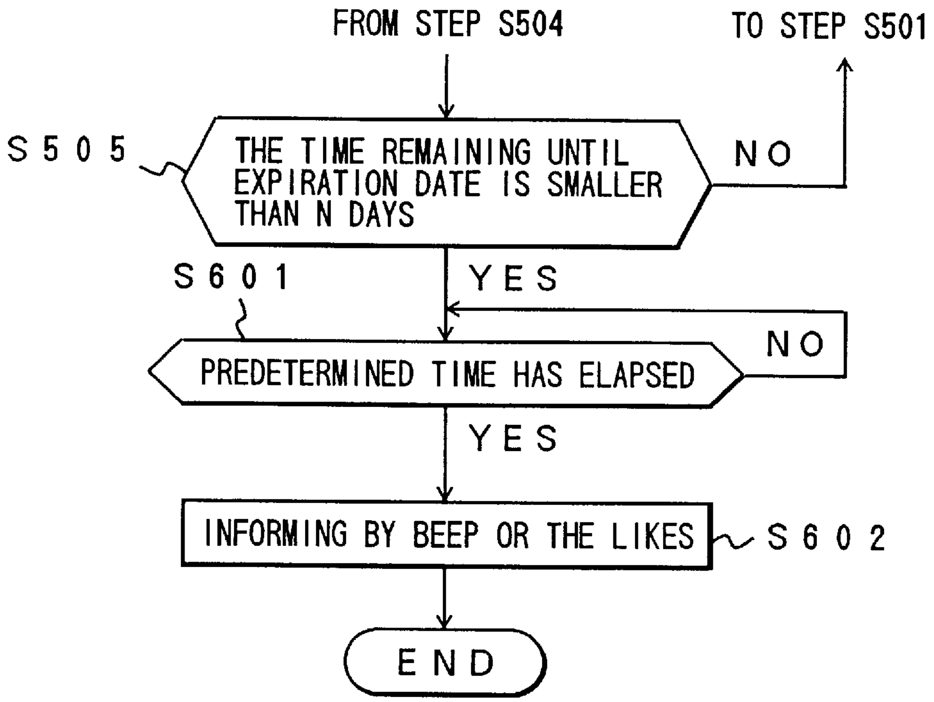
FIG. 6 is a flowchart showing a second operation of the wireless card according to the first embodiment of FIG. 4.

Referring to FIG. 6 where the steps S501–S505 are the same as those in FIG. 5, when the time remaining until the expiration date is smaller than N (YES in S505), the processor 202 starts up the timer 207 which is previously reset for a predetermined time period, and then checks whether the predetermined time period has passed (S601). When the time-out occurs (YES in S601), the processor 202 starts the informer 211 beeping, vibrating, or blinking, so that the user 101 is made aware of the expiration date approaching (S602).

According to the second method, the informer 211 is operated the predetermined time period after the user 101 has passed through the gate 105. For example, in the case where the timer 207 is reset for 30 minutes, the wireless card 102 is silent at the time when the user passes through the gate 105 but starts making a beep 30 minutes after the user 101 has passed through the gate 105. Needless to say, the timer 207 may be reset for a desired time period.

In the informing methods mentioned above, the processor 202 compares the expiration date to the present date. However, in cases where an expiration time point or an available time period is preset, the time remaining until the expiration time is compared to a predetermined time period.

SECOND EMBODIMENT

Figure 7:
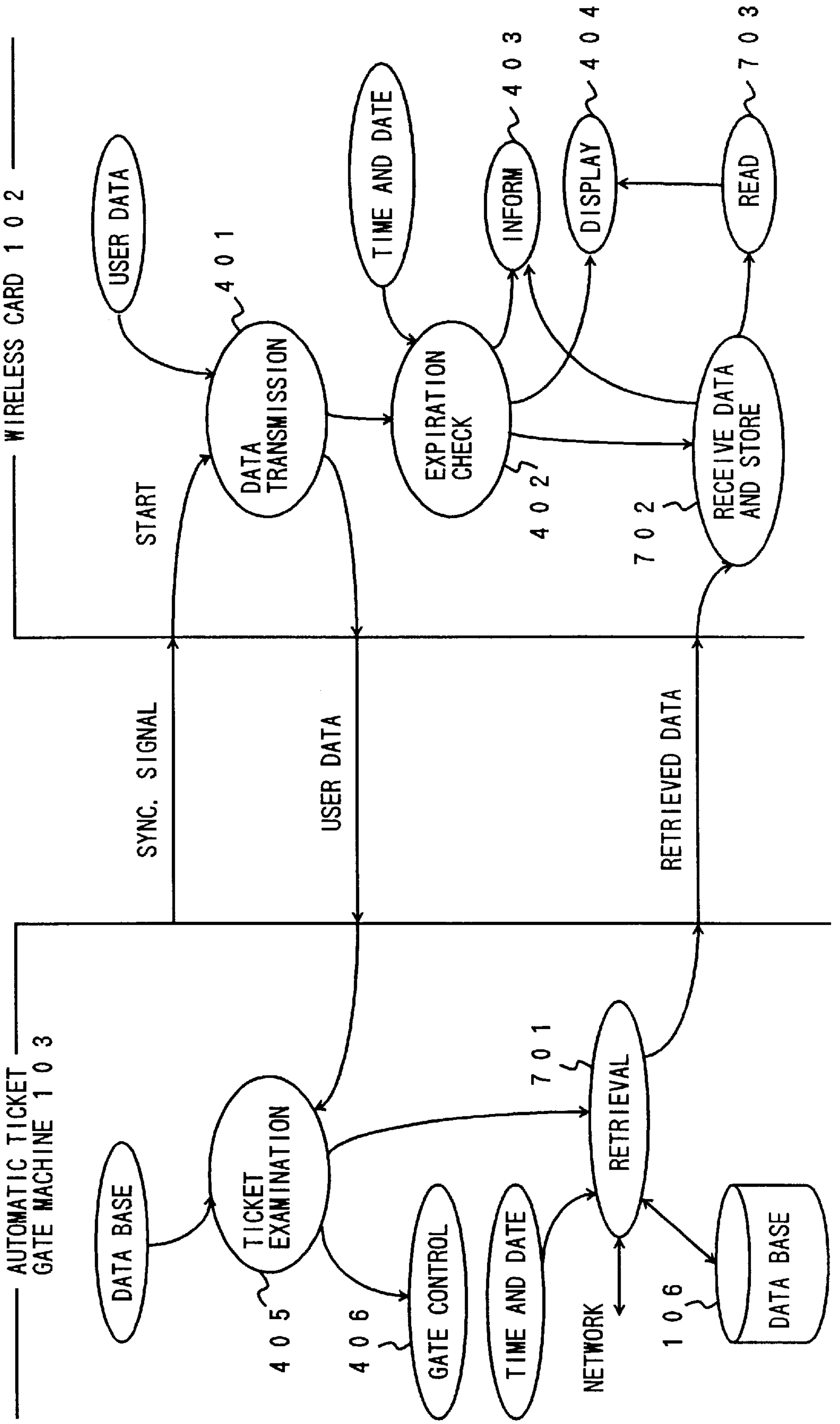
FIG. 7 is a schematic diagram showing the transportation guide method which is a second embodiment of a wireless communication method according to the present invention.

Referring to FIG. 7, where procedures similar to those previously described with reference to FIG. 4 are denoted by the same reference numerals, when the wireless transmitter-receiver system 201 receives the sync signal from the automatic ticket gate machine 103 and detects the sync establishment, the processor 202 starts up a data transmission procedure 401. If necessary, the expiration check procedure 402 may be performed. More specifically, the user information including the user ID number, the expiration date, the available section ranging from a start station to an end station, and other user information is transferred from the EEPROM 205 to the RAM 303 and is further transferred to the wireless transmitter-receiver system 201 which transmits it to the automatic ticket gate machine 103 (see FIG. 9B). In cases where the expiration check 402 is set, the processor 202 checks whether the expiration date approaches by comparing the expiration date to the present date obtained by the time and date clock 206. When the time remaining until the expiration date is smaller than a predetermined number of days, for example, three days, the processor 202 activates the informing procedure 403 and, as necessary, the displaying procedure 404. By the informer beeping, vibrating, or blinking, the user 101 is informed of the expiration date approaching. The expiration date may be displayed on the LCD 209.

On the other hand, the automatic ticket gate machine 103 receives the user information from the wireless card 102, stores it onto the RAM 303, and then performs the ticket examination 405 and the gate control 406. More specifically, the processor 301 compares the expiration date and the available section of the user information to the present date obtained by the time and date clock 308 and the route data obtained from the database 106, respectively. When the wireless card 102 is available, the processor 301 performs the gate control 406 such that the gate 105 is opened. When not available, the gate 105 is closed and the audible alert is activated.

According to the present embodiment, when the wireless card 102 is available, the processor 301 further starts up a retrieval procedure 701 by controlling the external storage controller 307 and the external communication controller 309. More specifically, the processor 301 reads the available section including the start station, the end station, and branch stations from the RAM 303, and searches the database 106 for transportation information related to the available section by referring to the present time and date obtained by the time and date clock 308, as described later in detail. For example, the departure time of the best one among available trains, the departure platform, the transfer station name, and other necessary information are retrieved by using the available section and the present time and date.

The retrieved transportation information is sent back to the wireless card 102. When receiving the transportation information from the automatic ticket gate machine 103, the processor 202 stores it onto the RAM 204 (procedure 702). The retrieved transportation information stored in the RAM 204 is read to be displayed on the LCD 209 according to the user's key operations (procedure 703). Therefore, the user 101 can read the necessary transportation information on screen at any desired time.

Figure 8:
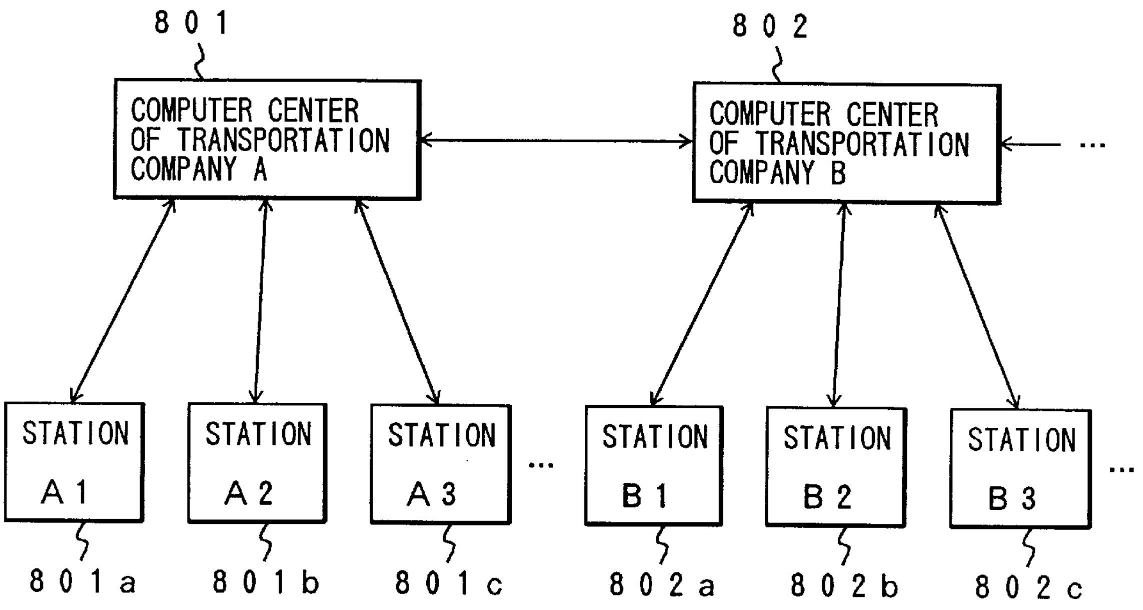
FIG. 8 is a schematic diagram showing a transportation guide network implementing the second embodiment of FIG. 7.

As shown in FIG. 8, the network 107 is comprised of a plurality of computer centers of different transportation companies, wherein each computer center contains a plurality of stations. For example, a transportation company A has a computer center 801 which controls a plurality of station computers 801*a*, 801*b*, 801*c*. Similarly, a transportation company B has a computer center 802 which controls a plurality of station computers 802*a*, 802*b*, 802*c*. Each station computer is provided with the database 106 and controls a plurality of automatic ticket gate machines as shown in FIGS. 1A, 1B, and 3. Each automatic ticket gate machine 103 is connected to the station computer through the external communication controller 309.

Since the computer centers of the transportation service companies are connected to each other, it is possible not only to deal with a change of the timetable of another transportation company but to issue a commuter ticket over two or more transportation companies.

USER INFORMATION

Figures 9A, 9B:
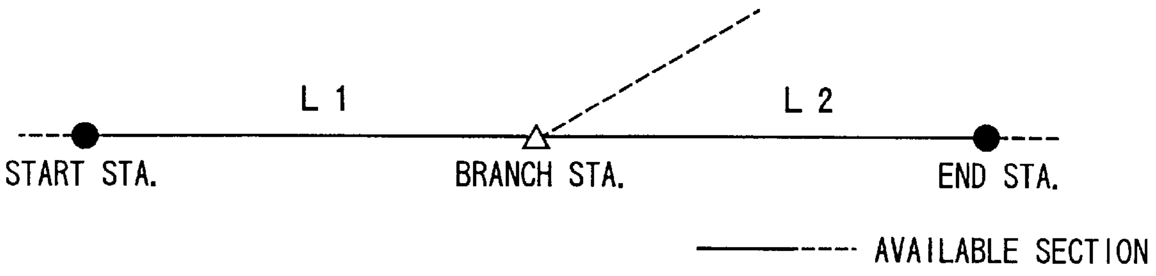
FIG. 9A is a schematic route diagram showing an example of user information transmitted from the wireless card to the automatic ticket gate machine according to the second embodiment of FIG. 7.
FIG. 9B is a schematic diagram showing the user information of FIG. 9A.

As illustrated in FIG. 9A, assuming that the user 101 has the wireless card 102 containing a commuter ticket of an available section from a start station to an end station through a branch station and of an available period from a start date to an end date.

In this case, when receiving the sync signal from the automatic ticket gate machine 103, the wireless card 102 transmits the user information to the automatic ticket gate machine 103. The user information, as shown in FIG. 9B, includes the followings: user ID number, Sex code, Age, Start date, End date, Start station code, Line code L1 from the start station to the branch station, Branch station code, Line code L2 from the branch station to the end station, End station code, and EOF (end of file) code. The user ID number may include the user's name. The available period is determined by the start date and the end date. The available section is determined by the start station, the end station, and the branch station.

The information items from User ID number to End date are necessary and the number of the items is fixed. The remaining items from Start station code to End station code are optional and the number of the items is variable. In cases where there is no branch station between the start and the end stations, the branch station code and line code related to the branch station are not transmitted. Contrarily, in cases where there is two or more branch stations between the start and the end stations, the branch station codes and line codes related to the branch stations are inserted between the start station code and the end station code.

RETRIEVED TRANSPORTATION INFORMATION

It is assumed that the user 101 has the wireless card 102 containing the commuter ticket as shown in FIGS. 9A and 9B and that the user 101 passes through the automatic ticket gate machine 103 of an intermediate station located between the start station and the branch station.

In this case, when receiving the sync signal from the automatic ticket gate machine 103, the wireless card 102 transmits the user information as shown in FIG. 9B to the automatic ticket. Receiving the user information from the wireless card 102, the processor 301 of the automatic ticket gate machine 103 stores the user information onto the RAM 303.

When the wireless card 102 is available, the processor 301 reads the available section including the start station, the end station, and the branch station from the RAM 303, and searches the timetable of the database 106 for transportation information related to the available section by referring to the present time and date obtained by the time and date clock 308.

Figure 10A:
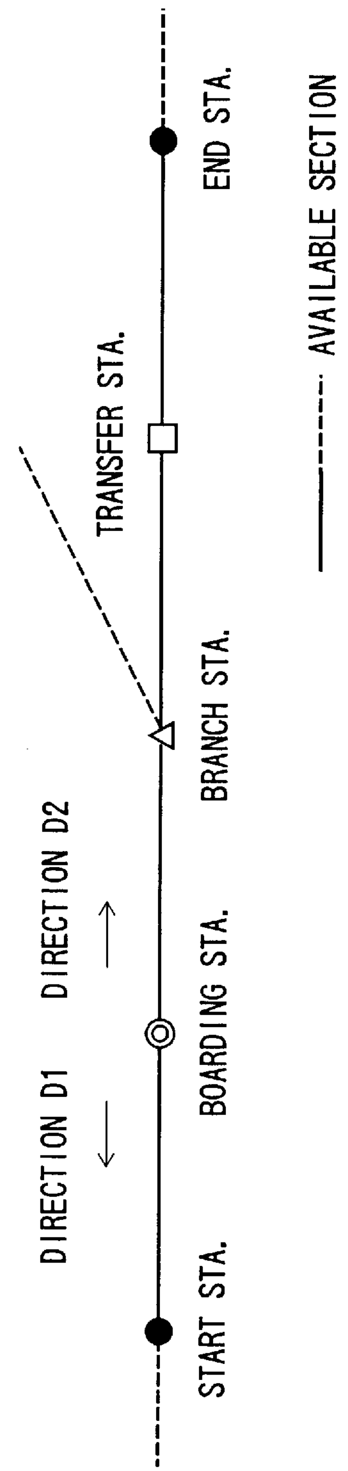
FIG. 10A is a schematic route diagram showing an example of available transportation information transmitted from the automatic ticket gate machine to the wireless card according to the second embodiment of FIG. 7.

As illustrated in FIG. 10A, the retrieved transportation information includes best transportation information in both directions D1 and D2. The retrieved transportation information like this is assembled into a transmission signal having a format as shown in FIG. 10B and then it is transmitted back to the wireless card 102.

Referring to FIG. 10B, when the wireless card 102 is available, the automatic ticket gate machine 103 transmits a valid flag followed by Boarding station code and the retrieved transportation information including first information of the direction D1 and second information of the direction D2. In this case, the first information is composed of the followings: Direction D1 code, Departure time at boarding station, Start station code, Arrival time at start station, Delay cause code, and Delay time. The Delay cause code and the Delay time are used to inform the user 101 of the delay cause and the delay time. In cases where transfers occur, the following items for each transfer are inserted between Departure time at boarding station and Start station code: Arrival time at transfer station, Transfer station code, Departure time at transfer station.

The second information is composed of the followings: Direction D2 code, Departure time at boarding station, Arrival time at transfer station, Transfer station code, Departure time at transfer station, End station code, Arrival time at end station, Delay cause code, and Delay time. Finally, the EOF code is transmitted.

In cases where the user 101 enters either the start station or the end station, the automatic ticket gate machine 103 transmits the valid flag followed by the start or the end station code and the retrieved transportation information of the direction D1 or D2.

Since the database 106 is updated through the network or the station computer, the most up-to-date transportation information is retrieved from the database 106. Therefore, when an accident happens, the delay time due to the accident is reflected throughout time information such as the Departure time at boarding station and the Arrival time at end station. When the wireless card 102 receives the transportation information including the Delay cause code and the Delay time from the automatic ticket gate machine 103, the transportation information is displayed on the usual area of the display device 209 with information indicating an abnormal condition such as “Accident, 10-min Delay” on a specific area of the display device 209. In cases where the transportation service is normal, the Delay cause code indicates “Normal”.

In the case where the wireless card 102 is judged as being invalid, the automatic ticket gate machine 103 transmits an invalid flag followed by Error code and the EOF code as shown in FIG. 11.

TRANSPORTATION GUIDE OPERATION

Figure 12:
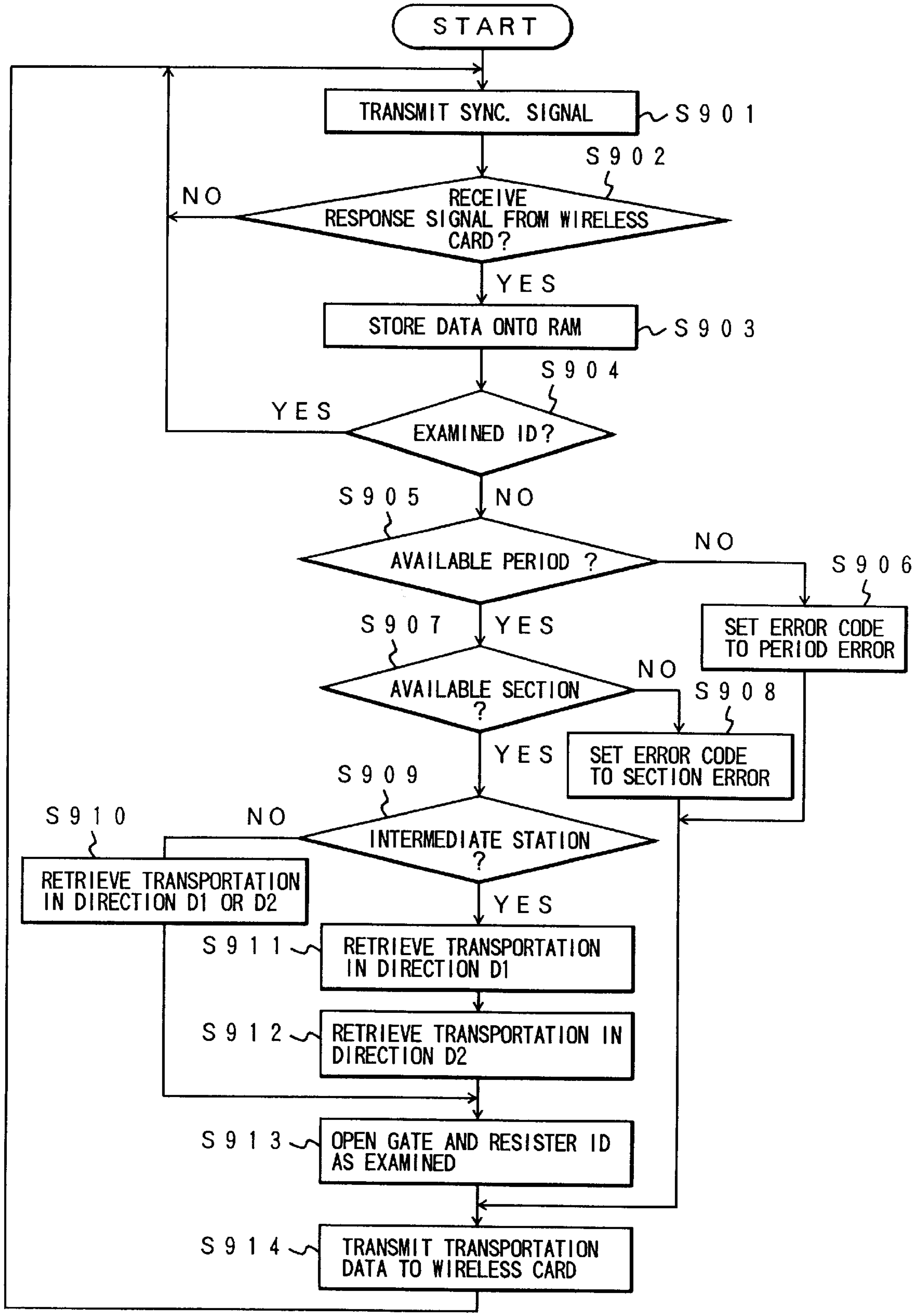
FIG. 12 is a flowchart showing an operation of the automatic ticket gate machine according to the second embodiment of FIG. 7.

Referring to FIG. 12, the automatic ticket gate machine 103 transmits the sync signal at predetermined timing which can be received in the predetermined area 104 (step S901). When receiving the sync signal, as described before, the wireless card 102 transmits the user information as the response signal as shown in FIG. 9B back to the automatic ticket gate machine 103 (step S902). The automatic ticket gate machine 103 repeatedly transmits the sync signal until the response signal to the sync signal is received.

When receiving the response signal from the wireless card 102, the automatic ticket gate machine 103 stores the user information onto the RAM 303 (step S903). The automatic ticket gate machine 103 analyzes the user information stored in the RAM 303, and first reads the user ID number from the RAM 303 and checks whether the user ID number has been examined by referring to the database 106 (step S904). If the wireless card 102 has been examined (YES in step S904), control is returned to the step S901 for transmitting the sync signal. Since the automatic ticket gate machine 103 determines whether the wireless card is available by checking the user ID number, many users successively passing through the passage can be identified and examined with reliability.

When the wireless card 102 has never been examined (NO in step S904), it is determined whether the wireless card 102 is within the available period based on the start date and the end date (step S905). If not available, the error code is set to Period error (step S906). When available, it is further checked whether the wireless card 102 is within the available section based on the start station, the end station, and branch stations (step S907). If not available, the error code is set to Section error (step S908).

In the case where the wireless card 102 is available (YES in steps S905 and S907), it is further checked whether the boarding station is an intermediate station between the start station and the end station (step S909). When the boarding station is the start or the end station (NO in step S909), the automatic ticket gate machine 103 retrieves the transportation information in a single direction D1 or D2 from the database 106 based on the user information (step S910). When the boarding station is the intermediate station (YES in step S909), the automatic ticket gate machine 103 retrieves the transportation information in both directions D1 and D2 from the database 106 based on the user information (step S911 and S912).

After the transportation information has been retrieved, the automatic ticket gate machine 103 opens the gate 105 and registers the user ID number as examined (step S913). Subsequently, the automatic ticket gate machine 103 transmits the retrieved transportation information to the wireless card 103 passing through the passage. As described before, when receiving the transportation information from the automatic ticket gate machine 103, the processor 202 stores it onto the RAM 204. The transportation information is read and displayed on screen by the user's key operation. Therefore, the user 101 can read the necessary transportation information on screen at any desired time.

According to the present embodiment described above, the automatic ticket gate machine 103 enables sending the wireless card 102 the above-mentioned transportation information including available transportation, the departure time and the arrival time of that transportation, transfers, and the departure time, the arrival time of the transfer transportation, and, if necessary, the departure platform. Further advertisements may be included.

Although the transportation information is displayed on the display device 209, it is possible to inform the user 101 of the transportation information by voice. In this case, the wireless card 102 is provided with a voice generator for converting the transportation information to voice signals.

EXAMPLES OF WIRELESS CARD

The wireless communications are not restricted to radio communications. Another wireless communication scheme can be employed in the first and second embodiments mentioned above. Several types of wireless card will be described hereinafter.

Figure 13:
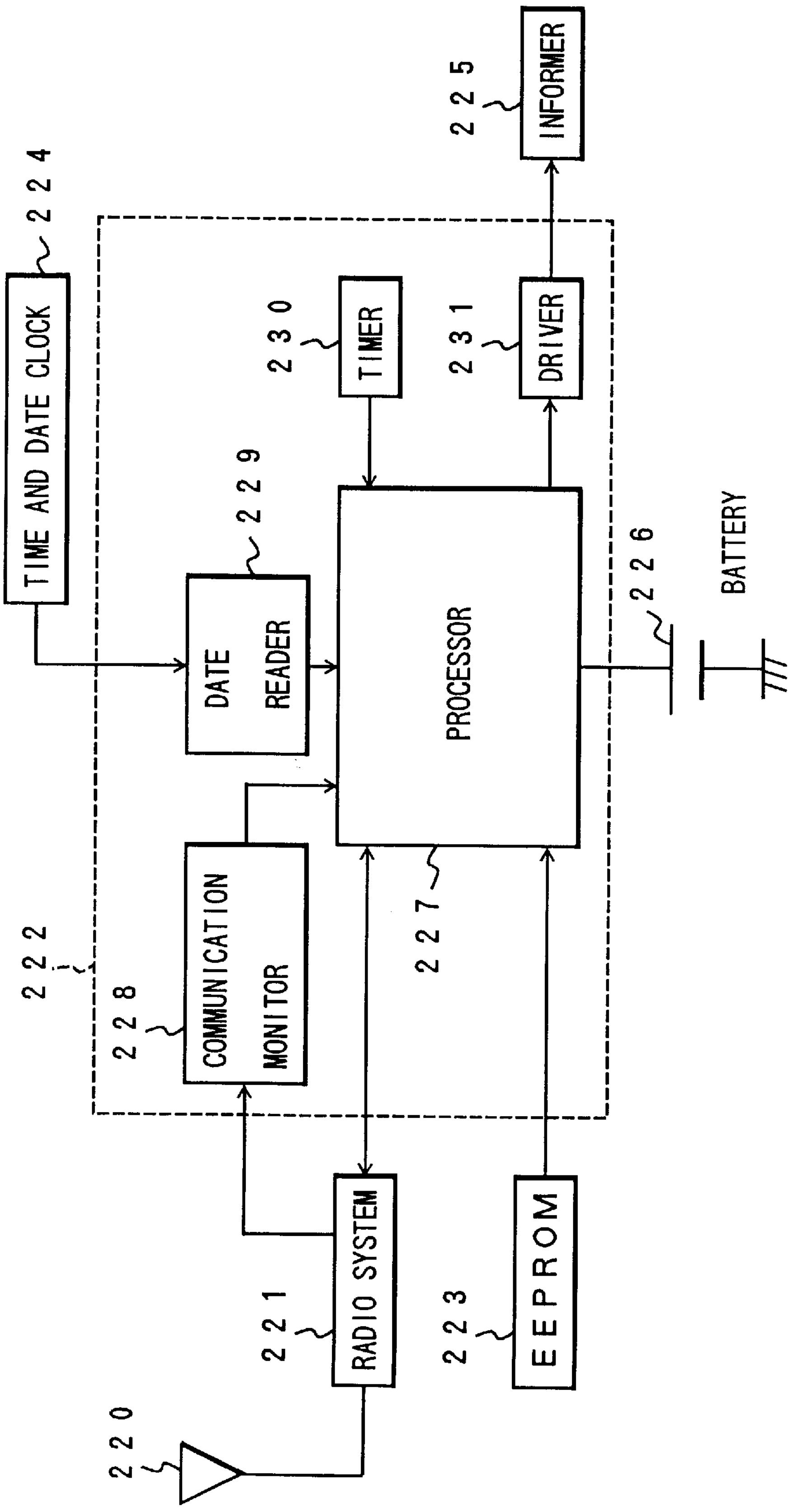
FIG. 13 is a block diagram showing a second embodiment of a wireless card according to the present invention.

Referring to FIG. 13, the wireless card 102 is provided with an antenna 220 and a radio system 221 which enables communicating with the automatic ticket gate machine 103 when the user 101 carrying the wireless card 102 enters the radio communication area 104 of the automatic ticket gate machine 103. The radio system 221 has a radio transceiver and a modulator-demodulator (not shown) therein. A control unit 222 is connected to an EEPROM 223, a time and date clock 224, an informer 225, and a battery 226. The control unit 222 includes a processor 227 which controls the whole operation of the wireless card 102 according to a program stored in a ROM (not shown). The processor 227 is connected to a communication monitor 228, a date reader 229, a timer 230, and an informer driver 231. The communication monitor 228 monitors a state of communication with the automatic ticket machine 103. The operations of the wireless card are the same as those as shown in FIGS. 4–6.

Figure 14:
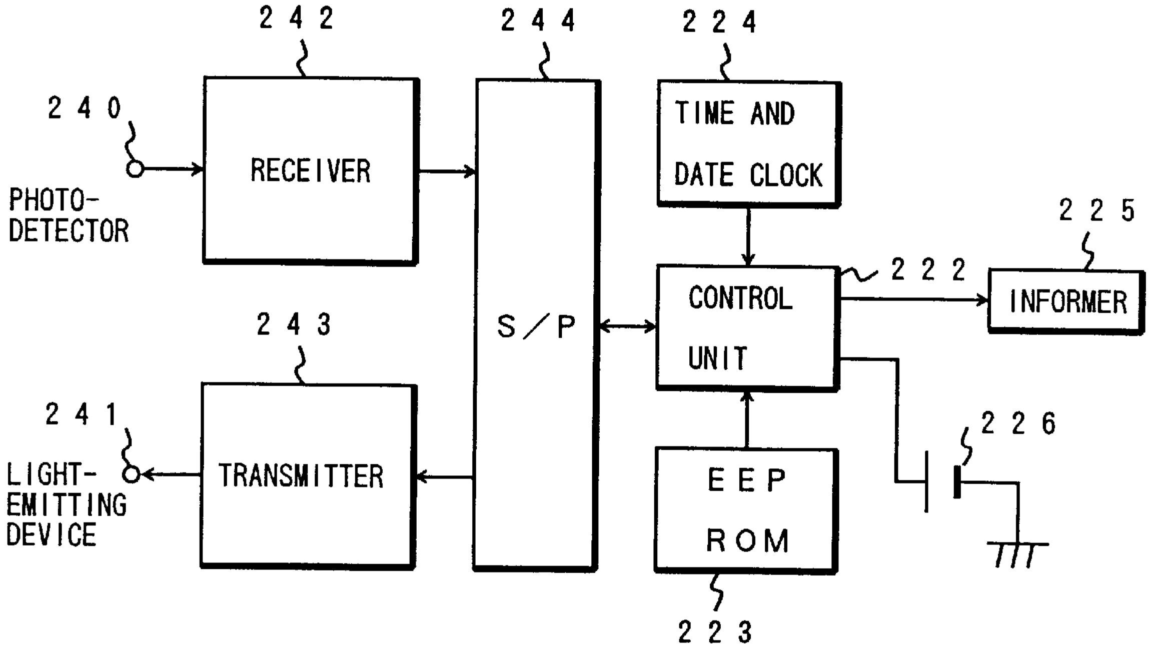
FIG. 14 is a block diagram showing a third embodiment of a wireless card according to the present invention.

Referring to FIG. 14, where circuit blocks similar to those previously described with reference to FIG. 13 are denoted by the same reference numerals, the wireless card is provided with an optical communication means comprising a photodetector 240, a light-emitting device 241, a receiver 242, a transmitter 243, and a serial-to-parallel converter 244. Received serial data is converted into parallel data which is output to the processor 227. On the other hand, transmitted parallel data is converted into serial data which is output to the transmitter 243. In this case, the sync signal is received at the photodetector 240 of the wireless card 102, and the user information is transmitted from the light-emitting device 241 to the automatic ticket gate machine 103. Needless to say, an optical receiver-transmitter is provided in the automatic ticket gate machine 103.

Figure 15:
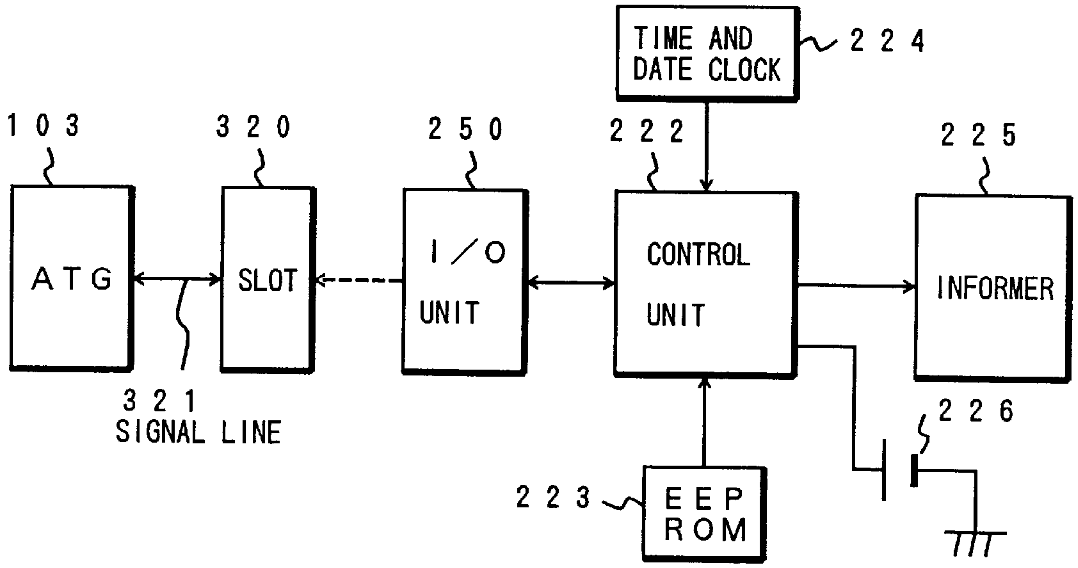
FIG. 15 is a block diagram showing a fourth embodiment of a wireless card according to the present invention.

Referring to FIG. 15, where circuit blocks similar to those previously described with reference to FIG. 13 are denoted by the same reference numerals, the wireless card is provided with an input/output unit 250 and the automatic ticket gate machine 103 is connected to a card slot 320 through a signal line 321. When the input/output unit 250 of the wireless card is inserted into the card slot 320 of the automatic ticket gate machine 103, the wireless card is electrically connected to the automatic ticket gate machine 103, enabling the above operations as shown in FIGS. 4 and 7.

What is claimed is:

1. A system comprising an examining machine and a wireless card carried by a user, wherein:

the examining machine comprises:

first wireless communication means for communicating with the wireless card passing through a predetermined area, the first wireless communication means transmitting a startup signal in the predetermined area; and examining means for examining whether the wireless card is available based on user information received from the wireless card through the first wireless communication means, and the wireless card comprises:

second wireless communication means for communicating with the examining machine;

storage means for previously storing the user information including an expiration time and an available transportation section;

transmission control means for controlling the second wireless communication means such that the user information is transmitted to the examining machine in response to the startup signal received from the examining machine;

indicating control means for indicating information obtained based on the user information, wherein the indicating control means comprises:

determining means for determining whether a time remaining until the expiration time is smaller than a predetermined time period when the startup signal has been received from the examining machine.

2. The system according to claim if wherein the indicating control means further comprises:

informing means for informing the user by a predetermined medium; and informing control means for controlling an operation of the informing means when it is determined that the time remaining until the expiration time is smaller than the predetermined time period.

3. The system according to claim 2, wherein the informing control means controls the operation of the informing means such that the informing means informs the user by the predetermined medium when it is determined that the time remaining until the expiration time is smaller than the predetermined time period.

4. The system according to claim 2, wherein the informing control means controls the operation of the informing means such that the informing means informs the user by the predetermined medium a predetermined time interval after it is determined that the time remaining until the expiration time is smaller than the predetermined time period.

5. The system according to claim 4, wherein the informing control means comprises:

timer means for detecting a lapse of the predetermined time interval after it is determined that the time remaining until the expiration time is smaller than the predetermined time period; and driving means for driving the informing means when the lapse of the predetermined time interval is detected.

6. The system according to claim 1, wherein the information obtained based on the user information is transportation information related to the user information, and the wireless card further comprises:

information storage means for storing the transportation information received from the examining machine.

7. The system according to claim 6, wherein the indicating control means comprises:

reading means for reading the transportation information from the information storage means according to a user instruction; and displaying means for displaying the transportation information read from the information storage means.

8. The system according to claim 6, wherein the examining machine further comprises:

user information storage means for storing the user information received from the wireless card;

retrieval means for retrieving the transportation information from a transportation information database by referring to the user information stored in the second storage means; and transmission control means for controlling the first wireless communication means such that the transportation information generated is transmitted to the wireless card.

9. A wireless card in a system comprising an examining machine, comprising:

wireless communication means for communicating with the examining machine when the wireless card passes through a predetermined area of the examining machine which transmits a synchronization signal in the predetermined area;

storage means for previously storing the user information including an expiration time;

transmission control means for transmitting the user information to the examining machine in response to the synchronization signal received from the examining machine; and informing control means for informing a user by a predetermined medium based on a time remaining until the expiration time.

10. The wireless card according to claim 9, wherein the informing control means comprises:

determining means for determining whether a time remaining until the expiration time is smaller than a predetermined time period when the startup signal has been received from the examining machine;

informing means for informing the user by the predetermined medium; and control means for controlling an operation of the informing means when it is determined that the time remaining until the expiration time is smaller than the predetermined time period.

11. The wireless card according to claim 10, wherein the control means controls the operation of the informing means such that the informing means informs the user by the predetermined medium when it is determined that the time remaining until the expiration time is smaller than the predetermined time period.

12. The wireless card according to claim 10, wherein the control means controls the operation of the informing means such that the informing means informs the user by the predetermined medium a predetermined time interval after it is determined that the time remaining until the expiration time is smaller than the predetermined time period.

13. The wireless card according to claim 12, wherein the informing control means comprises:

timer means for detecting a lapse of the predetermined time interval after it is determined that the time remaining until the expiration time is smaller than the predetermined time period.

14. A system for providing transportation guide information to a user, comprising a gate machine and a wireless card, wherein:

the gate machine comprises:

first wireless communication means for communicating with a wireless card passing through a predetermined area, the first wireless communication means transmitting a startup signal in the predetermined area, examining means for examining whether the wireless card is available based on user information received from the wireless card through the first wireless communication means;

retrieving means for retrieving the transportation guide information from a transportation information database based on an available transportation section included in the user information; and transmission control means for transmitting the transportation guide information to the wireless card, and the wireless card comprises:

second wireless communication means for communicating with the gate machine;

first storage means for previously storing the user information including a user identification number and the available transportation section;

communication control means for transmitting the user information to the gate machine in response to the startup signal received from the gate machine and receiving the transportation guide information from the gate machine;

second storage means for storing the transportation guide information received from the gate machine;

indicating control means for indicating the transportation guide information stored in the second storage means according to a user's instruction, wherein the indicating control means comprises:

determining means for determining whether a time remaining until the expiration time is smaller than a predetermined time period when the startup signal has been received from the examining machine.

15. The system according to claim 14, wherein the transportation guide information includes a departure time and an arrival time of transportation which is available at the time when the user passes through the gate machine.

16. The system according to claim 15, wherein the transportation guide information further includes change information indicating a change of departure time and arrival time and a cause of the change when a transportation schedule is changed.

17. The system according to claim 14, wherein the transportation information database includes a plurality of timetables each being updated when a transportation schedule is changed.

18. The system according to claim 17, wherein the transportation information database is connected to an external transportation database through a network.

19. The system according to claim 14, wherein the examining means examines whether the wireless card is available by referring to the user identification number received from the wireless card.

20. A wireless card in the system according to claim 14, wherein the user information includes an expiration time of the wireless card.

21. The wireless card according to claim 20, wherein the indicating control means comprises:

reading means for reading the transportation guide information from the second storage means according to the user instruction; and displaying means for displaying the transportation guide information read from the second storage means.

22. The wireless card according to claim 21, wherein the control means further comprises:

informing means for informing the user by a predetermined medium; and informing control means for controlling an operation of the informing means when it is determined that the time remaining until the expiration time is smaller than the predetermined time period.

23. The wireless card according to claim 22, wherein the informing control means controls the operation of the informing means such that the informing means informs the user by the predetermined medium when it is determined that the time remaining until the expiration time is smaller than the predetermined time period.

24. The wireless card according to claim 22, wherein the informing control means controls the operation of the informing means such that the informing means informs the user by the predetermined medium a predetermined time interval after it is determined that the time remaining until the expiration time is smaller than the predetermined time period.

25. The wireless card according to claim 24, wherein the informing control means comprises:

timer means for detecting a lapse of the predetermined time interval after it is determined that the time remaining until the expiration time is smaller than the predetermined time period; and driving means for driving the informing means when the lapse of the predetermined time interval is detected.

26. A method for providing information to a user in a system comprising an examining machine and a wireless card carried by the user, comprising the steps of:

a) transmitting a startup signal from the examining machine to the wireless card passing through a predetermined wireless communication area;

b) transmitting user information including an expiration time and an available transportation section from the wireless card to the examining machine in response to the startup signal received from the examining machine, the user information being previously stored in the wireless card;

at the examining machine, c) examining whether the wireless card is available based on the user information received from the wireless card; and at the wireless card, d) indicating the information obtained based on the user information and further determining whether a time remaining until the expiration time is smaller than a predetermined time period when the startup signal has been received from the examining machine.

27. The method according to claim 26, wherein the step d) further comprises the step of:

controlling an operation of informing the user by a predetermined medium when it is determined that the time remaining until the expiration time is smaller than the predetermined time period.

28. The method according to claim 27, wherein the operation of informing the user is controlled such that the user is informed by the predetermined medium when it is determined that the time remaining until the expiration time is smaller than the predetermined time period.

29. The method according to claim 27, wherein the informing control means controls the operation of the informing means such that the informing means informs the user by the predetermined medium a predetermined time interval after it is determined that the time remaining until the expiration time is smaller than the predetermined time period.

30. The method according to claim 26, wherein the step d) comprises the steps of:

receiving the information obtained based on the user information from the examining machine;

storing the information; and displaying the information stored according to a user's instruction.

31. The method according to claim 30, further comprising the steps of:

at the examining machine, e) storing the user information received from the wireless card;

f) retrieving the information from a transportation information database by referring to the user information stored; and g) transmitting the information retrieved to the wireless card.

* * * * *